(12) United States Patent
Winter et al.

(10) Patent No.: US 9,038,362 B2
(45) Date of Patent: May 26, 2015

(54) TURBOFAN ENGINE WITH VARIABLE AREA FAN NOZZLE AND LOW SPOOL GENERATOR FOR EMERGENCY POWER GENERATION AND METHOD FOR PROVIDING EMERGENCY POWER

(75) Inventors: Michael Winter, New Haven, CT (US); Charles E. Lents, Amston, CT (US)

(73) Assignee: UNITED TECHNOLOGIES CORPORATION, Hartford, CT (US)

( * ) Notice: Subject to any disclaimer, the term of this patent is extended or adjusted under 35 U.S.C. 154(b) by 1514 days.

(21) Appl. No.: 12/373,165

(22) PCT Filed: Oct. 12, 2006

(86) PCT No.: PCT/US2006/039952
§ 371 (c)(1),
(2), (4) Date: Jan. 9, 2009

(87) PCT Pub. No.: WO2008/045068
PCT Pub. Date: Apr. 17, 2008

(65) Prior Publication Data
US 2010/0236216 A1  Sep. 23, 2010

(51) Int. Cl.
*F02C 7/262* (2006.01)
*F01D 21/00* (2006.01)
*F02C 3/113* (2006.01)
*F02C 7/32* (2006.01)

(52) U.S. Cl.
CPC ............. *F02C 7/262* (2013.01); *F01D 21/00* (2013.01); *F02C 3/113* (2013.01); *F02C 7/32* (2013.01); *Y02T 50/671* (2013.01); *F05D 2270/092* (2013.01); *F05D 2270/061* (2013.01)

(58) Field of Classification Search
CPC ............ F02C 7/262; F02C 7/268; F02C 7/27; F02C 7/272; F02C 7/277; F02K 1/72; F02K 3/075
USPC .............. 60/771, 226.3; 239/265.19, 265.39
See application file for complete search history.

(56) References Cited

U.S. PATENT DOCUMENTS

| 3,779,665 A | | 12/1973 | Tatem, Jr. et al. | |
| 4,275,560 A | * | 6/1981 | Wright et al. | 60/226.3 |
| 4,292,802 A | | 10/1981 | Snow | |
| 4,327,548 A | * | 5/1982 | Woodward | 60/226.2 |
| 4,912,921 A | * | 4/1990 | Rice et al. | 60/774 |

FOREIGN PATENT DOCUMENTS

| DE | 29 51 962 | 7/1980 |
| EP | 0 798 454 | 10/1997 |
| GB | 612 414 | 11/1948 |

OTHER PUBLICATIONS

International Search Report for Pct Application No. PCT/US2006/039952, Sep. 19, 2007.

* cited by examiner

*Primary Examiner* — Craig Kim
(74) *Attorney, Agent, or Firm* — Carlson, Gaskey & Olds, P.C.

(57) ABSTRACT

A turbofan engine (10) employs a flow control device (41) that changes an effective exit nozzle area (40) associated with a bypass flow path (B) of the turbofan engine. A spool (14) couples a fan (20) to a generator (52). The turbofan emergency power system includes a controller (50) that communicates with the flow control device (41). Upon sensing an emergency condition, the controller manipulates the flow control device to reduce the effective nozzle exit area (40) of the bypass flow path, which chokes the flow through the bypass flow path thereby increasing the rotational speed of the fan. In this manner, the generator is driven at a higher rotational speed than if the flow through the bypass flow path was not choked, which enables a smaller generator to be utilized.

10 Claims, 2 Drawing Sheets

TURBOFAN ENGINE WITH VARIABLE AREA FAN NOZZLE AND LOW SPOOL GENERATOR FOR EMERGENCY POWER GENERATION AND METHOD FOR PROVIDING EMERGENCY POWER

This application claims priority to PCT Application Serial No. PCT/US2006/039952, filed on Oct. 12, 2006.

BACKGROUND OF THE INVENTION

This invention relates to a method and apparatus for employing emergency power in a turbofan engine.

Many commercial aircraft employ ram air turbines (RAT) as sources of emergency power in conditions where all main propulsions engines have failed. The RAT deploys from the aircraft fuselage and turbine blades unfold so that they may be driven by the aircrafts' forward motion. The turbine drives a hydraulic pump and/or electric generator. The RAT adds weight and cost to the aircraft. RATs must be checked periodically to ensure their operability since they are not deployed during normal aircraft usage.

Turbofan engines have been designed in which the fan is used to drive a generator in emergencies. In a turbofan engine, a flow path is arranged in the fan duct formed between core and fan nacelles. When the engine loses power, the fan rotationally drives a generator during a windmilling condition in which the fan is rotationally driven by airflow through the fan duct from the aircraft's forward motion. A large generator is required to provide sufficient power at the relatively low rotational speeds of the fan during the windmill condition. The large generator adds weight and cost to the turbine engine. Furthermore, the wide variation in the fan speed and the net pressure drop through the fan duct makes designing and efficient generator difficult.

What is needed is a turbine engine that enables a smaller generator to be used for emergencies.

SUMMARY OF THE INVENTION

A turbofan engine includes a core nacelle housing a compressor and turbine and a fan nacelle housing a fan driven by the turbine. The fan duct is formed between the core nacelle and the fan nacelle in which air driven by the fan bypasses the core flow. The turbofan engine employs a flow control device that changes an effective exit nozzle area associated with a bypass flow path of the turbofan. A controller communicates with the flow control device. A spool, which supports the fan and turbine in the example, couples the fan to a generator. Upon sensing an emergency condition in which the fan drives the generator, the controller manipulates the flow control device to reduce the effective nozzle exit area, which chokes the flow through the fan duct thereby increasing the rotational speed of the fan. In this manner, the generator is driven at a higher rotational speed than if the flow through the fan duct was not choked, which enables a smaller generator to be utilized.

These and other features of the present invention can be best understood from the following specification and drawings, the following of which is a brief description.

DETAILED DESCRIPTION OF THE PREFERRED EMBODIMENT

Figure 1:
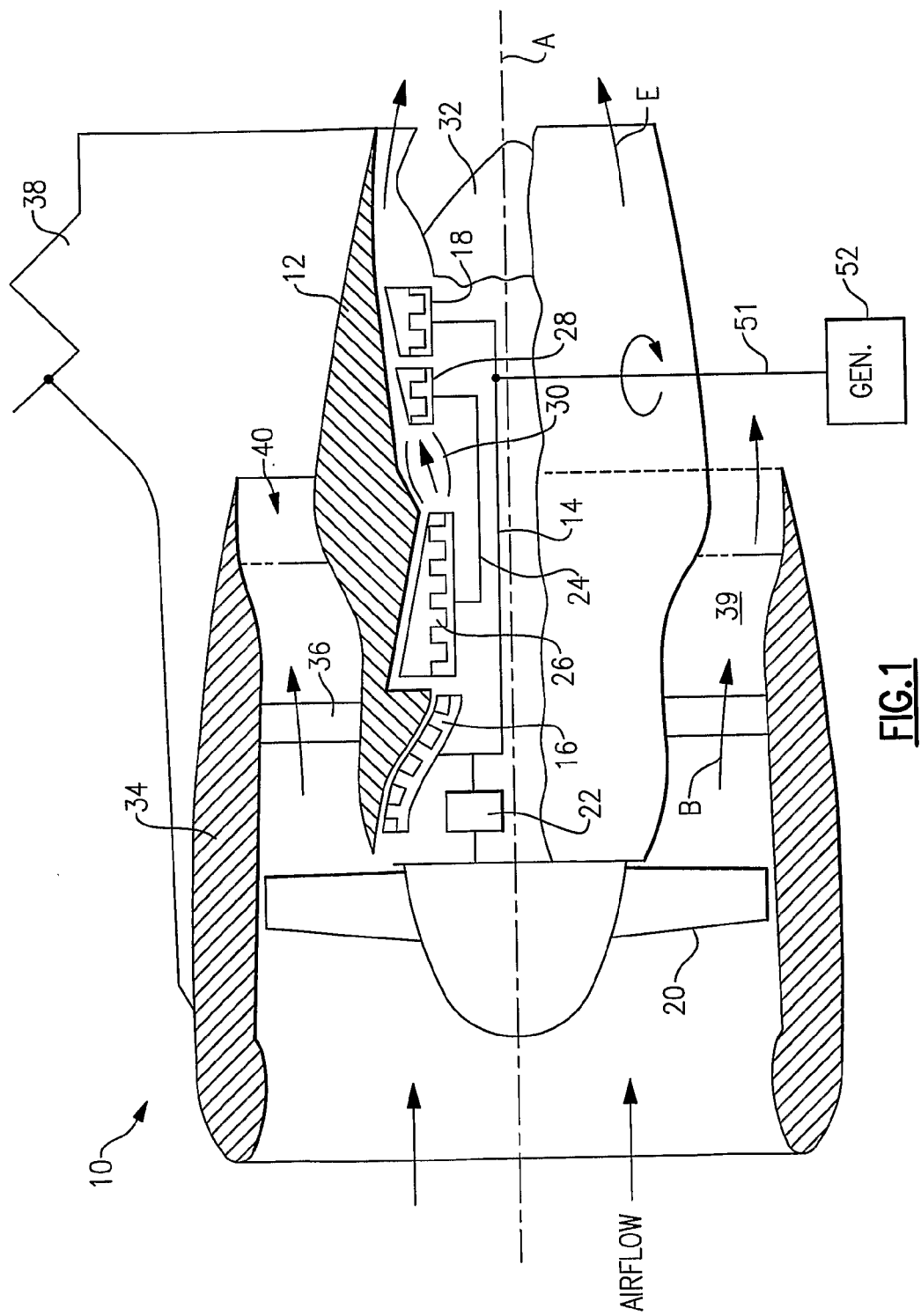
FIG. 1 is a cross-sectional view of an example geared turbofan engine.

A geared turbofan engine 10 is shown in FIG. 1. A pylon 38 supports the engine 10 on an aircraft. The engine 10 includes a core nacelle 12 that houses a low spool 14 and high spool 24 rotatable about an axis A. The low spool 14 supports a low pressure compressor 16 and low pressure turbine 18. In the example, the low spool 14 drives a fan 20 through a gear train 22. The high spool 24 supports a high pressure compressor 26 and high pressure turbine 28. A combustor 30 is arranged between the high pressure compressor 26 and high pressure turbine 28. Compressed air from compressors 16, 26 mixes with fuel from the combustor 30 and is expanded in turbines 18, 28.

In the examples shown, the engine 10 is a high bypass turbofan arrangement. In one example, the bypass ratio is greater than 10:1, and the fan diameter is substantially larger than the diameter of the low pressure compressor 16. The low pressure turbine 18 has a pressure ratio that is greater than 5:1, in one example. The gear train 22 is an epicycle gear train, for example, a star gear train, providing a gear reduction ratio of greater than 2.5:1. It should be understood, however, that the above parameters are only exemplary of a contemplated geared turbofan engine. That is, the invention is applicable to other engines including direct drive fans.

Airflow enters a fan nacelle 34, which surrounds the core nacelle 12 and fan 20. The fan 20 directs air into the core nacelle 12, which is used to drive the turbines 18, 28, as is known in the art. Turbine exhaust E exits the core nacelle 12 once it has been expanded in the turbines 18, 28, in a passage provided between the core nacelle and a tail cone 32.

The core nacelle 12 is supported within the fan nacelle 34 by structure 36, which are commonly referred to as upper and lower bifurcations. A generally annular bypass flow path 39 is arranged between the core and fan nacelles 12, 34. The example illustrated in FIG. 1 depicts a high bypass flow arrangement in which approximately eighty percent of the airflow entering the fan nacelle 34 bypasses the core nacelle 12. The bypass flow B within the bypass flow path 39 exits the fan nacelle 34 through a nozzle exit area 40.

For the engine 10 shown in FIG. 1, a significant amount of thrust may be provided by the bypass flow B due to the high bypass ratio. Thrust is a function of density, velocity and area. One or more of these parameters can be manipulated to vary the amount and direction of thrust provided by the bypass flow B. In one example, the engine 10 includes a structure associated with the nozzle exit area 40 to change the physical area and geometry to manipulate the thrust provided by the bypass flow B. However, it should be understood that the nozzle exit area may be effectively altered by other than structural changes, for example, by altering the boundary layer, which changes the flow velocity. Furthermore, it should be understood that any device used to effectively change the nozzle exit area is not limited to physical locations near the exit of the fan nacelle 34, but rather, includes altering the bypass flow B at any suitable location.

The engine 10 has a flow control device 41 that is used to effectively change the nozzle exit area. In one example, the flow control device 41 provides the fan nozzle exit area 40 for discharging axially the bypass flow B pressurized by the upstream fan 20 of the engine 10. A significant amount of thrust is provided by the bypass flow B due to the high bypass ratio. The fan 20 of the engine 10 is designed for a particular flight condition, typically cruise at 0.8M and 35,000 feet. The fan 20 is designed at a particular fixed stagger angle for an efficient cruise condition. The flow control device 41 is operated to vary the nozzle exit area 40 to adjust fan bypass air flow such that the angle of attack or incidence on the fan blade is maintained close to design incidence at other flight conditions, such as landing and takeoff. This enables desired engine operation over a range of flight condition with respect to performance and other operational parameters such as noise levels. In one example, the flow control device 41 defines a nominal converged position for the nozzle exit area 40 at cruise and climb conditions, and radially opens relative thereto to define a diverged position for other flight conditions. The flow control device 41 provides an approximately 20% change in the exit nozzle area 40.

In one example, the fan nacelle 34 includes multiple hinged flaps 42 arranged circumferentially about the rear the rear of the fan nacelle 34. The hinged flaps 42 can be actuated independently and/or in groups using segments 44. The segments 44 and individual hinged flaps 42 can be moved angularly using actuators 46. The segments 44 are guided by tracks 48 in one example.

FIG. 1 schematically illustrates a generator 52 driven by a shaft 51 coupled to the low spool 14. In one example, the shaft 51 is selectively engaged in a windmilling condition during which rotation of the fan 20 drives the generator 52. The generator 52, which can be an electric generator and/or hydraulic pump, provides emergency energy during critical component failure.

Figure 2:
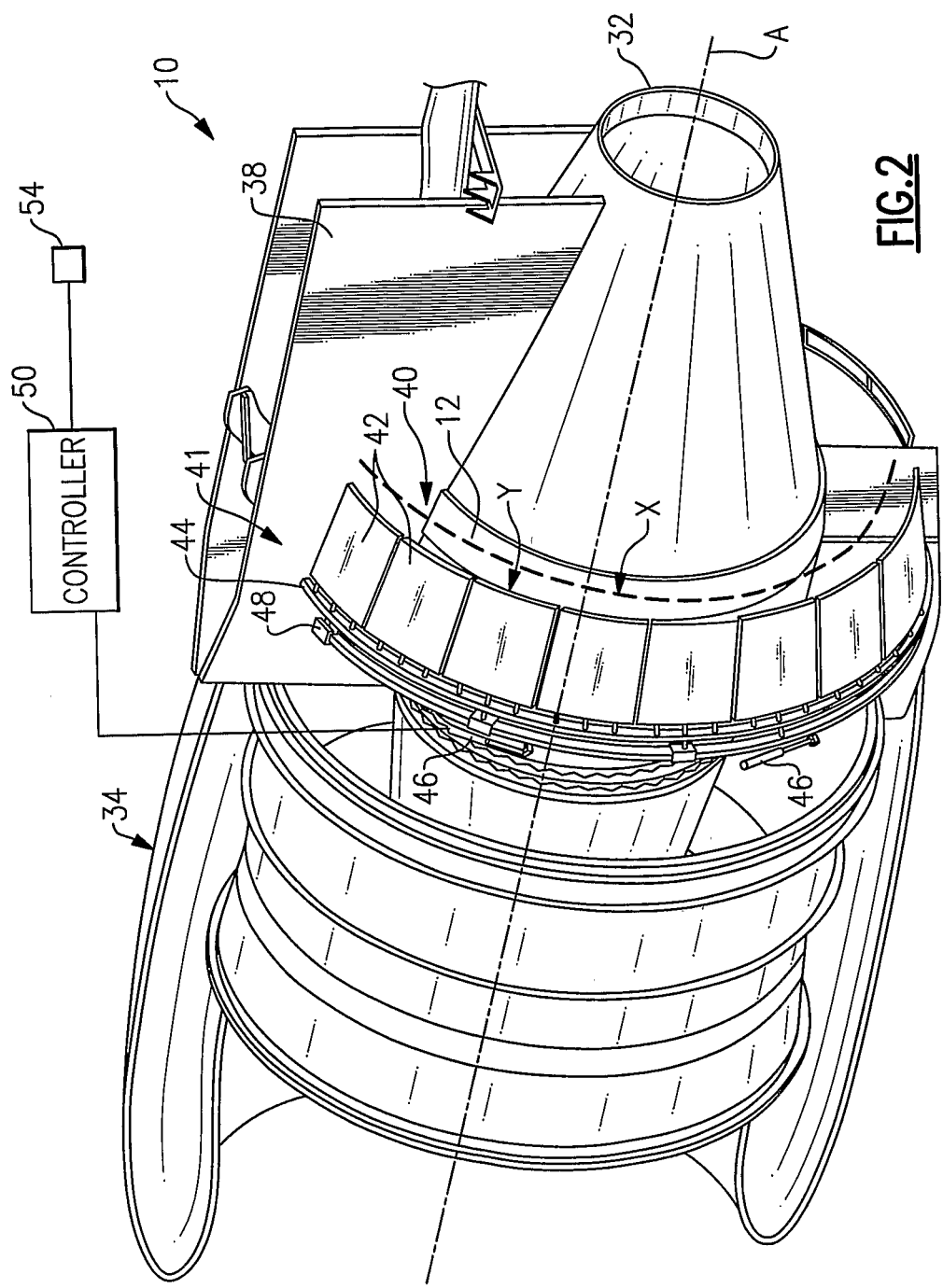
FIG. 2 is a partially broken perspective view of the geared turbofan engine shown in FIG. 1 including an emergency control system.

Referring to FIG. 2, the control device 41 manipulates the hinge flaps 42 using actuators 46. The hinged flaps 46 move between first positions X and second positions Y. The first position X is indicated in dashed lines in FIG. 2 and corresponds to a closed position, not necessarily a fully closed position, that is achieved during the emergency condition. The second position Y is an open position, not necessarily a fully opened position that may be used during various aircraft conditions.

The emergency system includes a sensor 54, which may be any component or components in the aircraft's control system that provides a signal indicative of an emergency condition. A controller 50 communicates with the sensor 54 and commands the control device 41 during an emergency windmilling condition, for example by manipulating the actuators 46, to move the hinged flaps 42 from the second position Y to the first position X to choke the flow through the bypass flow path B. As a result, the fan 20 will increase its rotational windmilling speed thereby driving the generator 52 (through the low spool 14 and shaft 51) at a higher rotational speed that is sufficient to produce a desired amount of power. This higher rotational speed allows the use of a smaller and lighter weight emergency generator.

Although an example embodiment of this invention has been disclosed, a worker of ordinary skill in this art would recognize that certain modifications would come within the scope of this invention. For that reason, the following claims should be studied to determine the true scope and content of this invention.

The invention claimed is:

1. A turbofan engine emergency control system comprising:
a spool supporting a turbine and arranged in a core nacelle;
a fan arranged upstream from the core nacelle and coupled to the spool;
a fan nacelle surrounding the fan and core nacelle and providing a bypass flow path that includes a nozzle exit area;
a generator coupled to the spool for receiving drive from the fan in a windmilling condition; and
a flow control device adapted to effectively changing the nozzle exit area in response to an emergency condition during the windmilling condition.

2. The turbofan engine emergency system according to claim 1, comprising a controller commanding the flow control device to effectively reduce but not fully block the nozzle exit area.

3. The turbofan engine emergency control system according to claim 2, wherein the generator includes a rotational speed in the windmilling condition, and effectively reducing the nozzle exit area increases the rotational speed.

4. The turbofan engine emergency control system according to claim 1, wherein the generator is an electric generator.

5. The turbofan engine emergency control system according to claim 1, wherein the generator is a hydraulic pump.

6. The turbofan engine emergency control system according to claim 1, wherein the flow control device is arranged downstream from the fan.

7. The turbofan engine emergency control system according to claim 1, wherein the spool includes a low pressure compressor and a low pressure turbine mounted thereon.

8. The turbofan engine emergency control system according to claim 1, comprising a gear train interconnected between the spool and the fan.

9. A method of providing emergency power using a turbofan engine comprising the steps of:
windmilling a fan in response to an emergency condition;
effectively reducing a nozzle exit area in response to the emergency condition to increase a rotational speed of the fan during the windmilling step; and
selectively engaging a generator during the windmilling step and driving the generator at the increased speed.

10. The method according to claim 9, comprising the step of driving a generator with the fan in the windmilling step.

* * * * *